US011321960B2

(12) United States Patent
Zhou

(10) Patent No.: US 11,321,960 B2
(45) Date of Patent: May 3, 2022

(54) DEEP LEARNING-BASED THREE-DIMENSIONAL FACIAL RECONSTRUCTION SYSTEM

(71) Applicant: ArcSoft Corporation Limited, Zhejiang (CN)

(72) Inventor: Wei Zhou, Hangzhou (CN)

(73) Assignee: ArcSoft Corporation Limited, Zhejiang (CN)

( * ) Notice: Subject to any disclaimer, the term of this patent is extended or adjusted under 35 U.S.C. 154(b) by 14 days.

(21) Appl. No.: 17/105,660

(22) Filed: Nov. 27, 2020

(65) Prior Publication Data

US 2022/0027602 A1    Jan. 27, 2022

(30) Foreign Application Priority Data

Jul. 22, 2020  (CN) .......................... 202010709985.0

(51) Int. Cl.
| | |
|---|---|
| *G06V 40/16* | (2022.01) |
| *H04N 13/257* | (2018.01) |
| *G06K 9/62* | (2022.01) |
| *H04N 13/271* | (2018.01) |
| *G06N 3/08* | (2006.01) |
| *H04N 13/275* | (2018.01) |
| *H04N 13/282* | (2018.01) |
| *H04N 13/246* | (2018.01) |

(52) U.S. Cl.
CPC ......... *G06V 40/166* (2022.01); *G06K 9/6256* (2013.01); *G06N 3/08* (2013.01); *H04N 13/246* (2018.05); *H04N 13/257* (2018.05); *H04N 13/271* (2018.05); *H04N 13/275* (2018.05); *H04N 13/282* (2018.05)

(58) Field of Classification Search
CPC ... H04N 13/257; H04N 13/271; H04N 13/275
See application file for complete search history.

(56) References Cited

U.S. PATENT DOCUMENTS

| | | | |
|---|---|---|---|
| 2016/0261850 A1* | 9/2016 | Debevec | G06V 40/16 |
| 2018/0137644 A1* | 5/2018 | Rad | G06V 10/454 |
| 2018/0268601 A1* | 9/2018 | Rad | G06K 9/6256 |
| 2019/0180084 A1* | 6/2019 | Bouaziz | G06T 17/20 |
| 2020/0184727 A1* | 6/2020 | Ha | G06T 19/006 |
| 2020/0380229 A1* | 12/2020 | Peruch | G06K 7/1443 |

* cited by examiner

*Primary Examiner* — Jayanti K Patel
*Assistant Examiner* — Christopher Kingsbury Glover
(74) *Attorney, Agent, or Firm* — Winston Hsu

(57) ABSTRACT

A 3D facial reconstruction system includes a main color range camera, a plurality of auxiliary color cameras, a processor and a memory. The main color range camera is arranged at a front angle of a reference user to capture a main color image and a main depth map of the reference user. The plurality of auxiliary color cameras are arranged at a plurality of side angles of the reference user to capture a plurality of auxiliary color images of the reference user. The processor executes instructions stored in the memory to generate a 3D front angle image according to the main color image and the main depth map, generate 3D side angle images according to the 3D front angle image and the plurality of auxiliary color images, and train an artificial neural network model according to a training image, the 3D front angle image and 3D side angle images.

11 Claims, 9 Drawing Sheets

DEEP LEARNING-BASED THREE-DIMENSIONAL FACIAL RECONSTRUCTION SYSTEM

CROSS REFERENCE TO RELATED APPLICATION

This non-provisional application claims priority of China patent application No. 202010709985.0, filed on 22 Jul. 2020, included herein by reference in its entirety.

BACKGROUND OF THE INVENTION

1. Field of the Invention

The invention relates to facial reconstruction, and in particular, to a deep learning-based three-dimensional facial reconstruction system.

2. Description of the Prior Art

In computer vision, both the three-dimensional (3D) facial reconstruction technology and expression tracking technology are related to obtaining and establishing a face shape and appearance of a human face, and are used in the fields of facial recognition and expression driving. In general, the conventional 3D facial reconstruction technology and expression tracking technology have problems of low reconstruction accuracy and low expression discrimination, and as a consequence, additional signal processing of the reconstructed image has been used to obtain an accurate 3D reconstructed image.

SUMMARY OF THE INVENTION

According to one embodiment of the invention, a deep learning-based three-dimensional (3D) facial reconstruction system includes a main color range camera, a plurality of auxiliary color cameras, a processor and a memory. The main color range camera is arranged at a front angle of a reference user, and is used to capture a main color image and a main depth map of the reference user from the front angle. The plurality of auxiliary color cameras are arranged at a plurality of side angles of the reference user, and are used to capture a plurality of auxiliary color images of the reference user from the plurality of side angles. The processor is coupled to the main color range camera and the plurality of auxiliary color cameras. The memory is coupled to the processor and is used to store a plurality of instructions. The processor is used to execute the plurality of instructions to generate a 3D front angle image of a 3D ground truth model according to the main color image and the main depth map, generate a plurality of 3D side angle images of the 3D ground truth model according to the 3D front angle image and the plurality of auxiliary color images, and train an artificial neural network model according to a training image, the 3D front angle image and the plurality of 3D side angle images.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
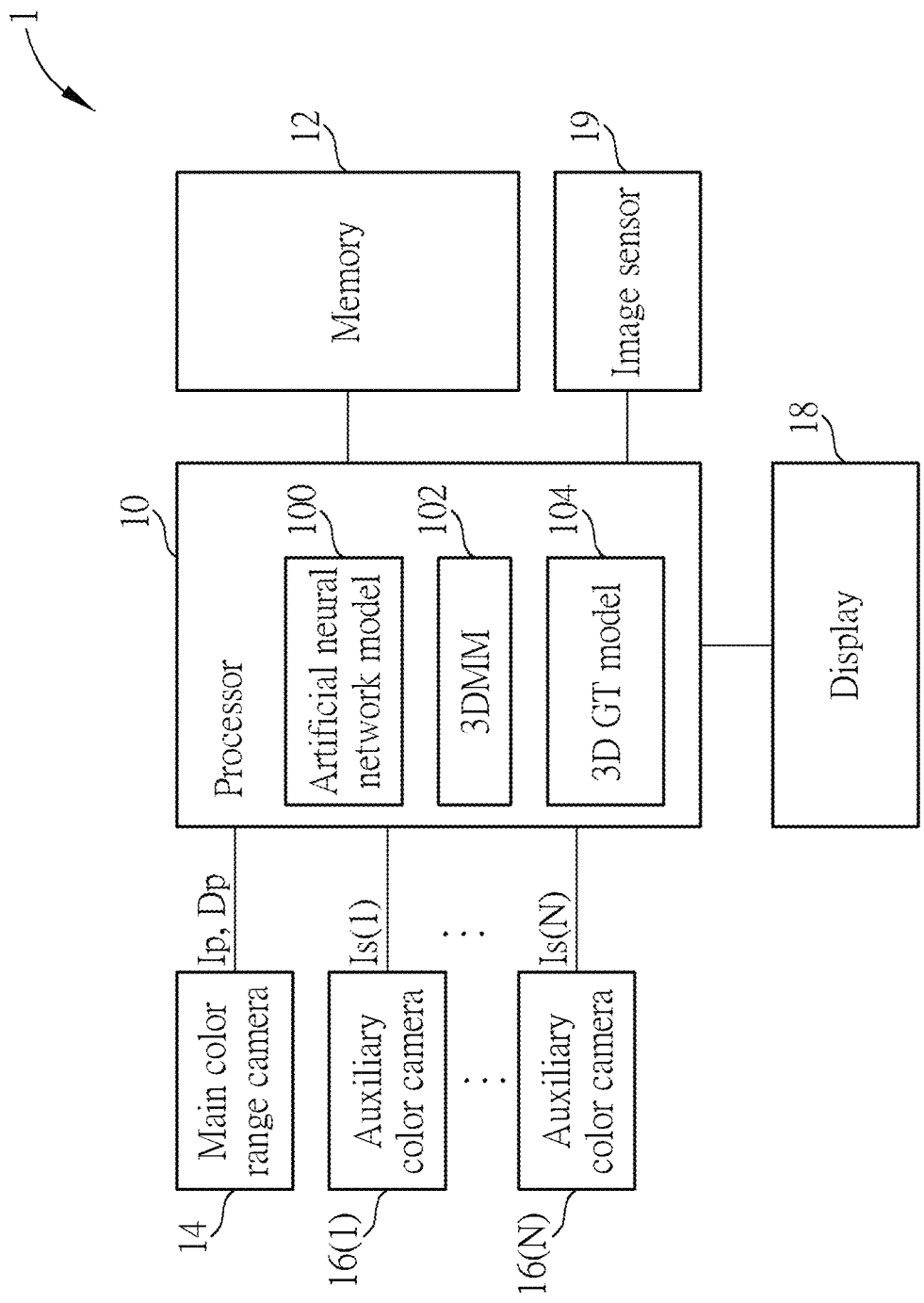
FIG. 1 is a block diagram of a three-dimensional (3D) facial reconstruction system according to an embodiment of the invention.

FIG. 1 is a block diagram of a 3D facial reconstruction system 1 according to an embodiment of the invention. The three-dimensional (3D) facial reconstruction system 1 may receive 2D face images, and perform 3D facial reconstruction and facial expression tracking according to the 2D face images. The 3D facial reconstruction system 1 may be adopted in 3D facial reconstruction, expression driving, and Avatar animation driving, may employ the reconstructed face to obtain 3D landmark points, facial swapping, and face segmentation, and may employ face shape coefficients to perform facial recognition and an attribute analysis for drivers' faces. The 3D facial reconstruction system 1 may fit a 3D morphable model (3DMM) to a 2D face image to reconstruct a 3D face model. The 3D morphable model may be based on the principal component analysis (PCA), and may adopt a plurality of model coefficients to generate facial landmarks of the 3D face model, such as using face shape coefficients to control a face shape of the 3D face model and facial expression coefficients to control a facial expression of a 3D human face model. In addition, the 3D facial reconstruction system 1 may employ an artificial neural network model to generate required model coefficients, and the artificial neural network model may be trained using a 3D ground truth (GT) model to serve as a training target. The 3D ground truth model may be a 3D model generated according to actual measurements, and may have a plurality of accurate 3D images corresponding to a plurality of viewing angles, the viewing angles covering a yaw angle ranging from −90° to 90° and a pitch angle ranging from of −45° to 45°. Since the 3D ground truth model includes large-angle 3D images, the artificial neural network model may be trained by the 3D ground truth model to accurately predict the model coefficients of a large-angle 3D face model. The artificial neural network model may train face shape coefficients and facial expression coefficients respectively to enhance the accuracy of initial expression and individual expressions.

The 3D facial reconstruction system 1 may include a processor 10, a memory 12, a main color range camera 14, auxiliary color cameras 16(1) to 16(N), a display 18, and an image sensor 19, N being a positive integer, e.g., N=18. The processor 10 may be coupled to the memory 12, the main color range camera 14, the plurality of auxiliary color cameras 16(1) to 16(N), the display 18 and the image sensor 19. The processor 10, the memory 12, the display 18, and the image sensor 19 may be integrated in a common device such as a mobile phone, a computer, or an embedded device. The processor 10 may include an artificial neural network model 100, a 3D morphable model (3DMM) 102, and a 3D GT model 104. The artificial neural network model 100 may be a convolutional neural network. In some embodiments, the artificial neural network model 100 may be a visual geometry group (VGG) model, an AlexNet model, a GoogleNet inception model, a ResNet model, a DenseNet model, an SEnet model, a feature pyramid network (FPN) model or a MobileNet model.

The 3D facial reconstruction system 1 may operate in a training phase and a facial reconstruction phase. In the training phase, the 3D facial reconstruction system 1 may generate the 3D GT model 104, and train the artificial neural network model 100 according to the training images and the 3D GT model 104. In the facial reconstruction stage, the 3D facial reconstruction system 1 may input a two-dimensional (2D) image of a user into the trained artificial neural network model 100 to generate a 3D model of the user, and display the 3D model of the user on the display 18. The processor 10 may control operations of the memory 12, the main color range camera 14, the plurality of auxiliary color cameras 16(1) to 16(N), the display 18 and the image sensor 19 to perform the training phase and the facial reconstruction phase. After the 3D GT model 104 is generated, the connection between the main color range camera 14 and the auxiliary color cameras 16(1) to 16(N) to the processor 10 may be disconnected.

Figure 2:
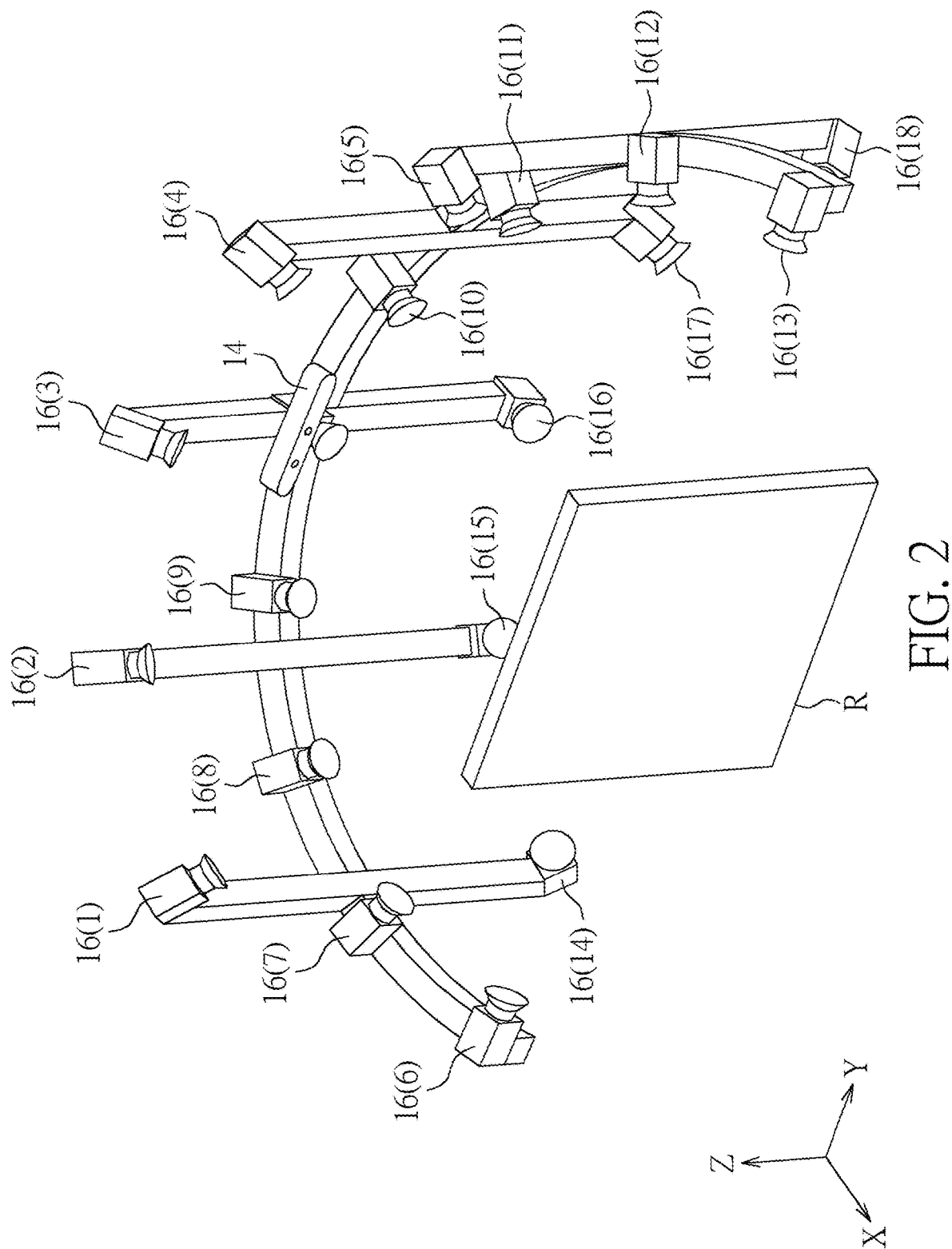
FIG. 2 is a schematic diagram of a configuration of the color range camera and the auxiliary color cameras of the system in FIG. 1.

FIG. 2 is a schematic diagram of a configuration of the main color range camera 14 and the auxiliary color cameras 16(1) to 16(N) of the 3D facial reconstruction system 1. The main color range camera 14 may be arranged at a front angle of a reference user, and the auxiliary color cameras 16(1) to 16(18) may be arranged at 18 side angles of the reference user, respectively. The front angle and the side angles may be defined by the yaw angle and pitch angle of the reference user R. The yaw angle is the angle of the reference user R's head rotating around the z axis, and the pitch angle is the angle of the head of the user R rotating around the y axis. The main color range camera 14 may be arranged at a position where the yaw angle is 0° and the pitch angle is 0°. The 18 side angles may be evenly distributed over yaw angles ranging between −90° and 90°, and over pitch angles ranging between −45° and 45°. For example, the auxiliary color camera 16(6) may be arranged at the yaw angle of −90° and the pitch angle is 0°. The arrangements of the auxiliary color cameras 16(1) to 16(18) are not limited to the embodiment in FIG. 2, and may also be arranged in other distribution manners, e.g., at other yaw angles or pitch angle ranges.

The main color range camera 14 and the auxiliary color cameras 16(1) to 16(18) may substantially simultaneously capture images of the reference user R from different angles, and capture 19 color images and 1 depth map of the face of the reference user R at once. The main color range camera 14 may capture a main color image Ip and a main depth map Dp of the reference user R from the front angle. The auxiliary color cameras 16(1) to 16(18) may capture a plurality of auxiliary color images Is(1) to Is(18) of the reference user R from the plurality of side angles, respectively.

The memory 12 may store a plurality of instructions. The processor 10 may execute the plurality of instructions stored in the memory 12 to execute the training method 300 in the training phase and execute the 3D image reconstruction method 1000 in the facial reconstruction phase.

Figure 3:
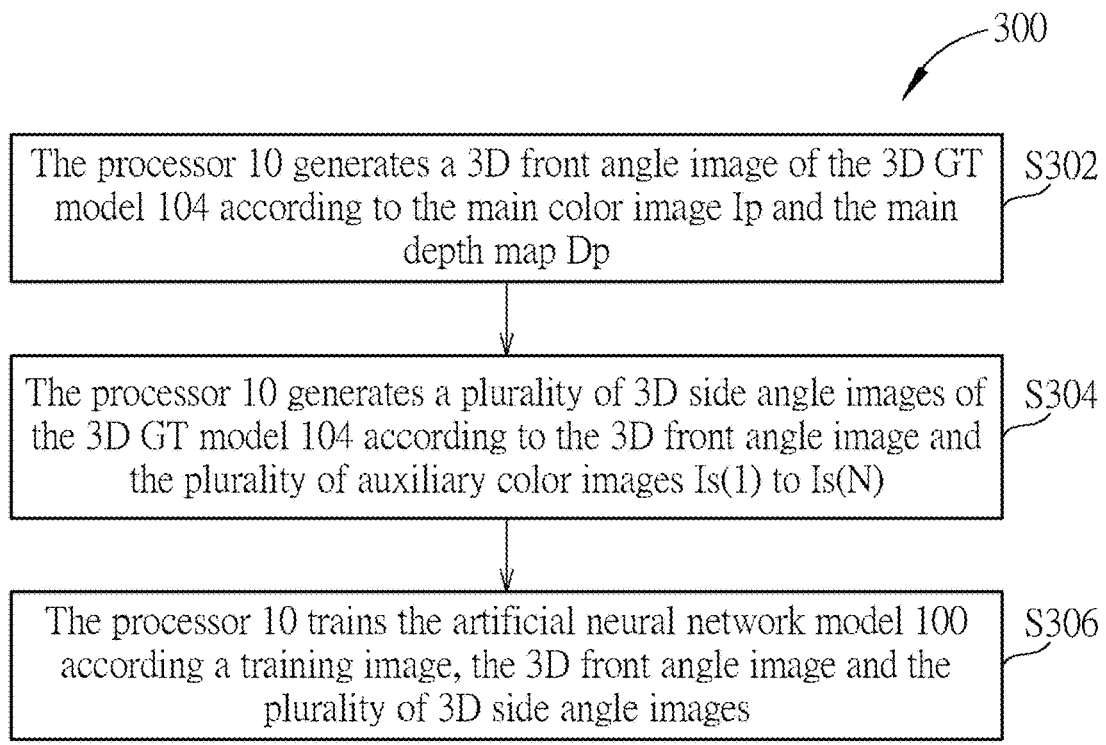
FIG. 3 is a flowchart of a method of training the artificial neural network model in the system in FIG. 1.

FIG. 3 is a flowchart of a method 300 of training the artificial neural network model 100 in the 3D facial reconstruction system 1. The training method 300 includes steps S302 to S306. Steps S302 and S304 are used to prepare the 3D GT model 104. Step S306 is used to train the artificial neural network model 100. Any reasonable step change or adjustment is within the scope of the disclosure. Steps S302 to S306 are detailed as follows:

Step S302: The processor 10 generates a 3D front angle image of the 3D GT model 104 according to the main color image Ip and the main depth map Dp;

Step S304: The processor 10 generates a plurality of 3D side angle images of the 3D GT model 104 according to the 3D front angle image and the plurality of auxiliary color images Is(1) to Is(N);

Step S306: The processor 10 trains the artificial neural network model 100 according a training image, the 3D front angle image and the plurality of 3D side angle images.

In Step S302, the processor 10 uses the main color image Ip and the main depth map Dp captured from the front angle to perform high-precision expression fitting to generate an accurate 3D front angle image. Next in Step S304, the processor 10 uses the accurate 3D front angle image and calibration parameters of the auxiliary color cameras 16(1) to 16(N) to perform a ground truth migration for the viewing angles of the auxiliary color cameras 16(1) to 16(N), so as to generate other accurate 3D side angle images. Finally in Step S306, the processor 10 trains the artificial neural network model 100 according a training image, the accurate 3D front angle image and the plurality of accurate 3D side angle images.

In some embodiments, in Step S304, the generation of the 3D side angle image of the 3D GT model 104 may be replaced by using a pre-trained model to pre-process the images of large poses, and then adjusting the images manually, or adopting other methods of mapping the front angle and other angles to perform the ground truth migration.

The training method 300 utilizes the main depth map Dp to perform high-precision expression fitting to generate the accurate 3D front angle image, and then performs the ground truth migration to migrate the 3D front angle image to other cameras' angles to generate the accurate 3D side angle images, thereby training an accurate artificial neural network model 100, preventing the disadvantages of inaccurate fitting of large-angle 3D models in the conventional facial reconstruction methods.

Figure 4:
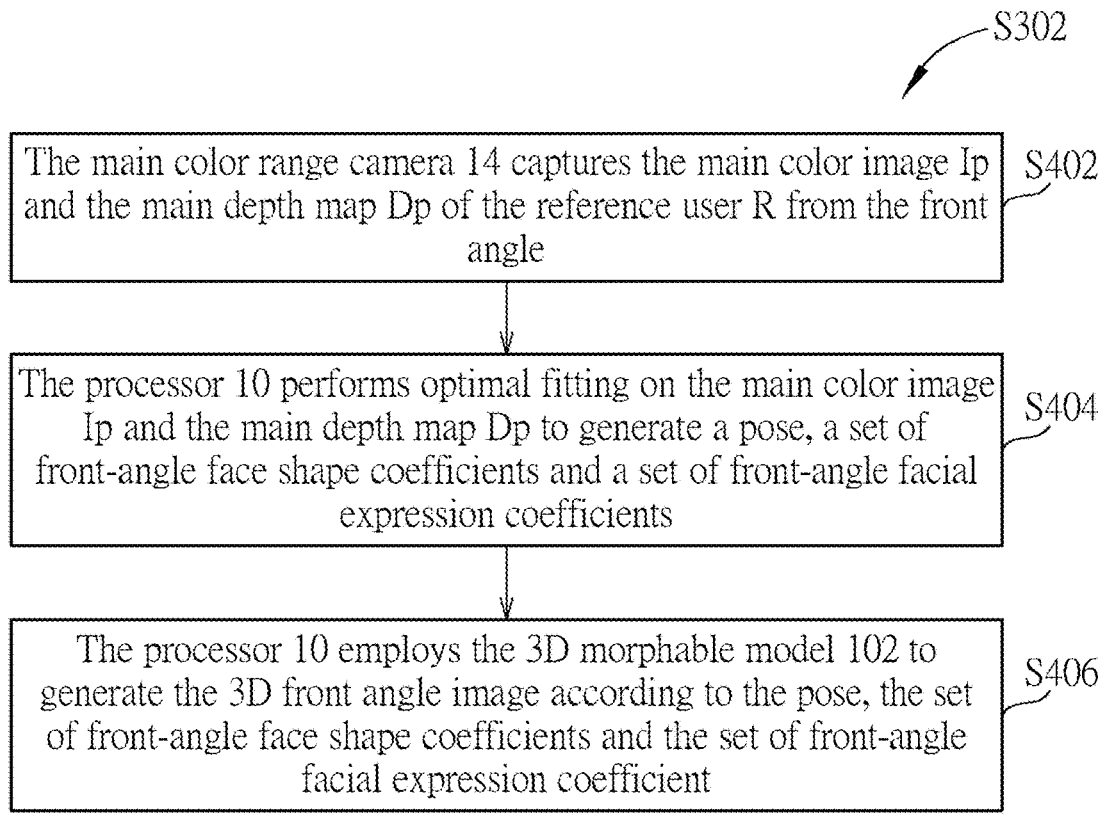
FIG. 4 is a flowchart of Step S302 in FIG. 3.

FIG. 4 is a flowchart of Step S302 in FIG. 3, including Steps S402 to S406. Steps S402 to S406 are used to generate the 3D front angle image. Any reasonable step change or adjustment is within the scope of the disclosure. Steps S402 to S406 are detailed as follows:

Step S402: The main color range camera 14 captures the main color image Ip and the main depth map Dp of the reference user R from the front angle;

Step S404: The processor 10 performs optimal fitting on the main color image Ip and the main depth map Dp to generate a pose, a set of front-angle face shape coefficients and a set of front-angle facial expression coefficients;

Step S406: The processor 10 employs the 3D morphable model 102 to generate the 3D front angle image according to the pose, the set of front-angle face shape coefficients and the set of front-angle facial expression coefficient.

In Step S402, the main color range camera 14 photographs the face of the reference user R from the front angle to capture the color image Ip and the main depth map Dp. In Step S404, the processor 10 performs landmark detection on the color image Ip, and then employs the main depth map Dp to perform an optimal fitting to obtain the pose, the set of front-angle face shape coefficients, and the set of front-angle facial expression coefficients. The pose may be the head pose of the 3D model, representing the direction and position of the head in relation to the main color range camera 14. The set of front-angle face shape coefficients may include a plurality of face shape coefficients, e.g., 100 face shape coefficients, respectively representing facial features of a human face such as a chubby face shape or a skinny face shape. The set of front-angle facial expression coefficients may include a plurality of expression coefficients, e.g., 48 expression coefficients, respectively representing facial expression features such as a squinting expression or a grinning expression. Finally in step S406, the processor 10 generates the accurate 3D front angle image according to the pose, the set of front-angle facial expression coefficients, and the set of front-angle facial expression coefficients.

Compared to the method of using only the main color image Ip, the set of front angle face shape coefficients and the set of front-angle facial expression coefficients obtained from the main depth map Dp and the main color image Ip are more accurate, resulting in a more accurate front angle 3D image.

Figure 5:
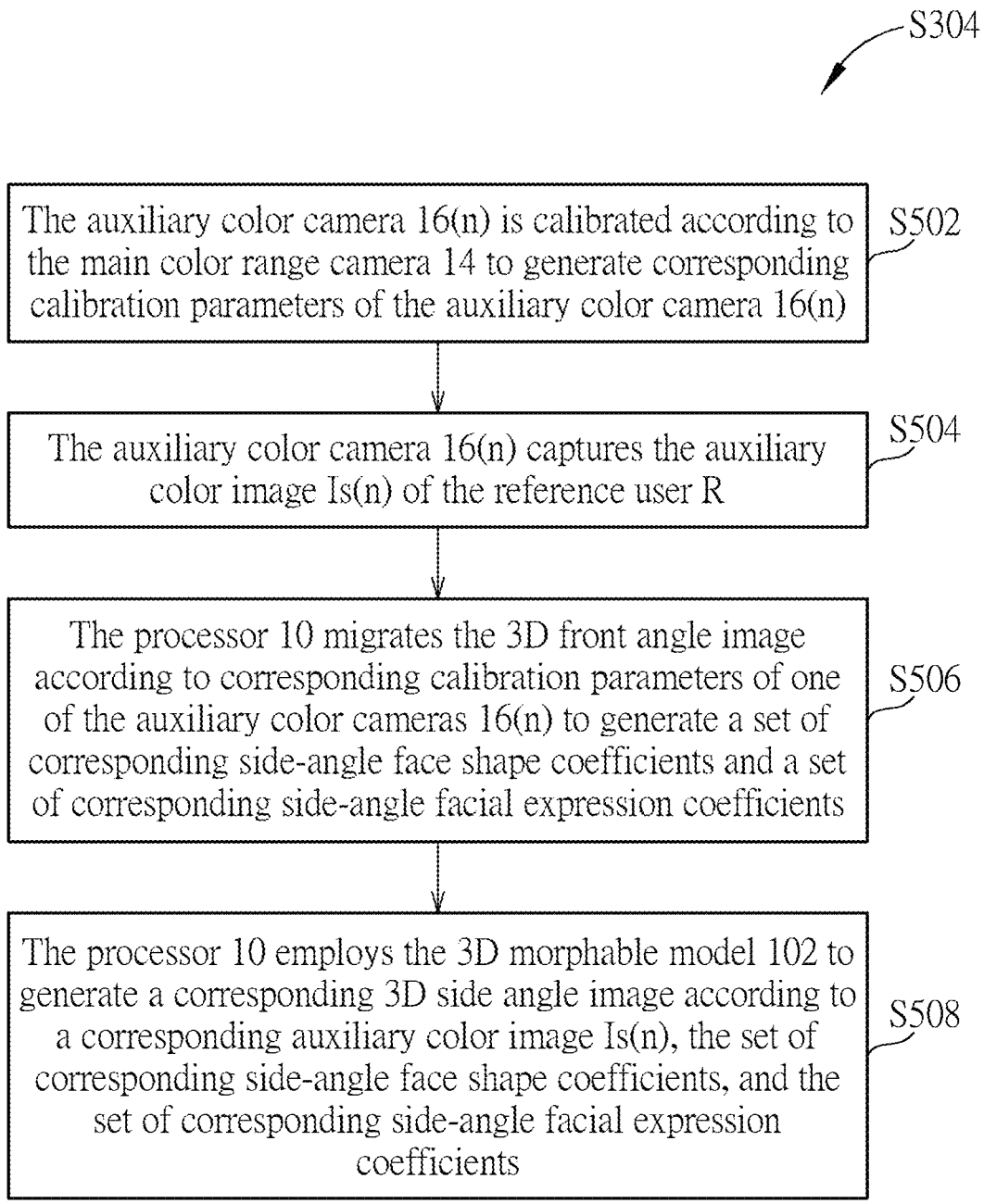
FIG. 5 is a flowchart of Step S304 in FIG. 3.

FIG. 5 is a flowchart of Step S304 in FIG. 3, including Steps S502 to S508. Step S502 is used to generate the corresponding calibration parameters of an auxiliary color camera 16(n). Steps S504 to S508 are used to perform the ground truth migration for the viewing angle of the auxiliary color camera 16(n) according to corresponding calibration parameters of the auxiliary color camera 16(n), so as to generate accurate 3D side angle images. Any reasonable step change or adjustment is within the scope of the disclosure. Steps S502 to S508 are detailed as follows:

Step S502: The auxiliary color camera 16(n) is calibrated according to the main color range camera 14 to generate corresponding calibration parameters of the auxiliary color camera 16(n);

Step S504: The auxiliary color camera 16(n) captures the auxiliary color image Is(n) of the reference user R;

Step S506: The processor 10 migrates the 3D front angle image according to corresponding calibration parameters of one of the auxiliary color cameras 16(n) to generate a set of corresponding side-angle face shape coefficients and a set of corresponding side-angle facial expression coefficients;

Step S508: The processor 10 employs the 3D morphable model 102 to generate a corresponding 3D side angle image according to a corresponding auxiliary color image Is(n), the set of corresponding side-angle face shape coefficients, and the set of corresponding side-angle facial expression coefficients.

The auxiliary color camera 16(n) is one of the auxiliary color cameras 16(1) to 16(N), and n is a positive integer between 1 and N. In Step S502, the main color range camera 14 serves as a reference camera for use to calibrate the auxiliary color camera 16(n) to generate the calibration parameters. The calibration parameters may include external parameters of the auxiliary color camera 16(n), and the external parameters may include rotation parameters, translation parameters, zoom parameters, affine translation parameters, and other external camera parameters. The main color range camera 14 and the auxiliary color camera 16(n) may each have internal parameters, and the internal parameters may include lens deformation parameters, focal length parameters, and other internal camera parameters. In Step S506, the processor 10 generates the 3D front angle image according to the pose, the set of front-angle face shape coefficients, and the set of front-angle facial expression coefficients, and migrates the 3D front angle image to the angle of the auxiliary color cameras 16(n) to generate the set of corresponding side-angle face shape coefficients and the set of corresponding side-angle facial expression coefficients of the auxiliary color cameras 16(n). In Step S508, the processor 10 generates an accurate corresponding 3D side angle image according to the set of corresponding side-angle face shape coefficients and the set of corresponding side-angle facial expression coefficients. Steps S502 to S508 may be executed for the auxiliary color cameras 16(1) to 16(N) in turn to generate corresponding 3D side angle images of the auxiliary color cameras 16(1) to 16(N).

In Step S304, the ground truth migration is performed on the viewing angle of the auxiliary color camera 16(n) according to the calibration parameters, so as to generate the accurate corresponding 3D side angle image.

Figure 6:
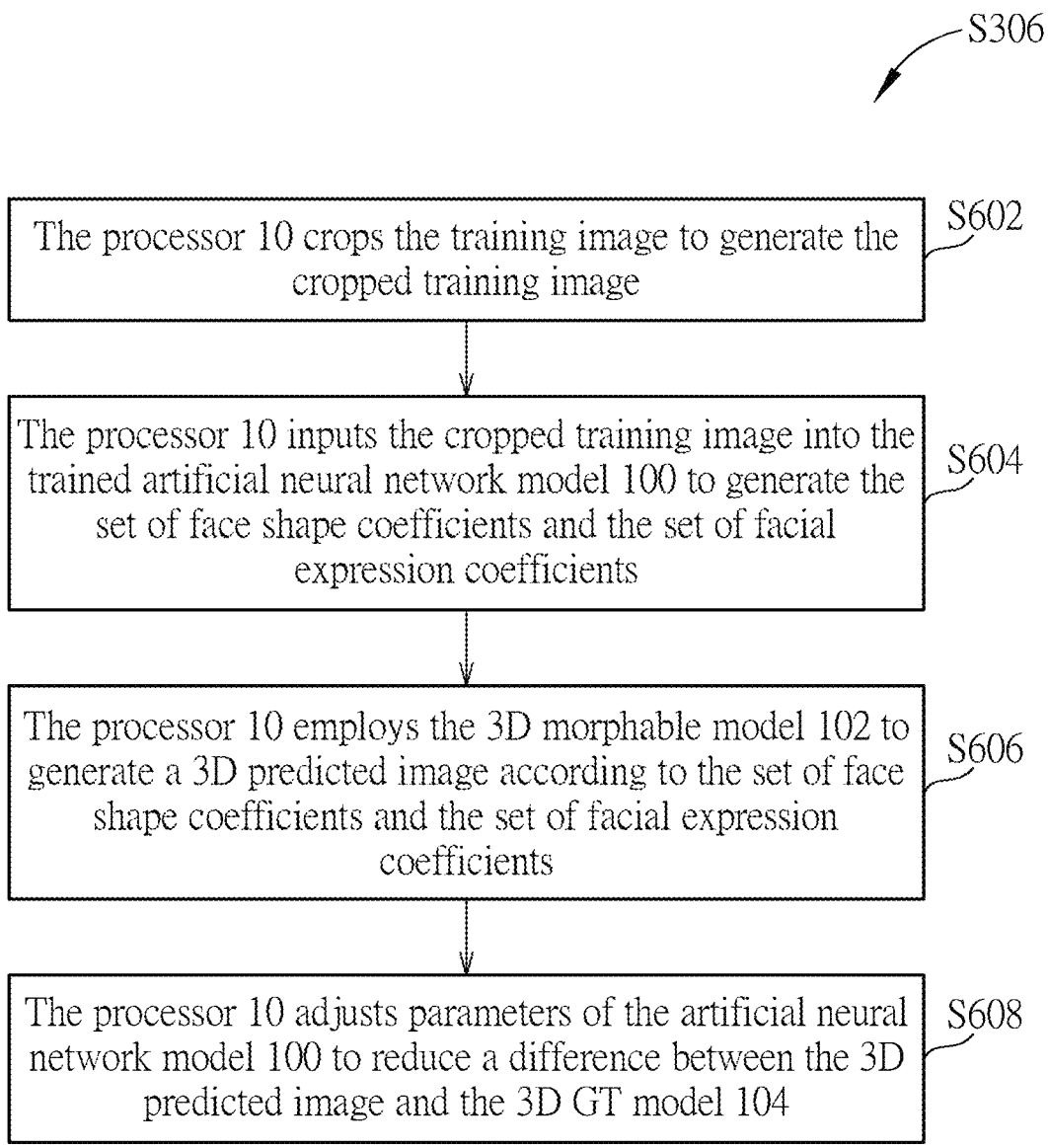
FIG. 6 is a flowchart of Step S306 in FIG. 3.

FIG. 6 is a flowchart of Step S306 in FIG. 3, including Steps S602 to S608. Step S602 is used to crop the training image to obtain a stable cropped image. Steps S604 to S608 are used to train the artificial neural network model 100. Any reasonable step change or adjustment is within the scope of the disclosure. Steps S602 to S608 are detailed as follows:

Step S602: The processor 10 crops the training image to generate the cropped training image;

Step S604: The processor 10 inputs the cropped training image into the trained artificial neural network model 100 to generate the set of face shape coefficients and the set of facial expression coefficients;

Step S606: The processor 10 employs the 3D morphable model 102 to generate a 3D predicted image according to the set of face shape coefficients and the set of facial expression coefficients;

Step S608: The processor 10 adjusts parameters of the artificial neural network model 100 to reduce a difference between the 3D predicted image and the 3D GT model 104.

Figure 8:
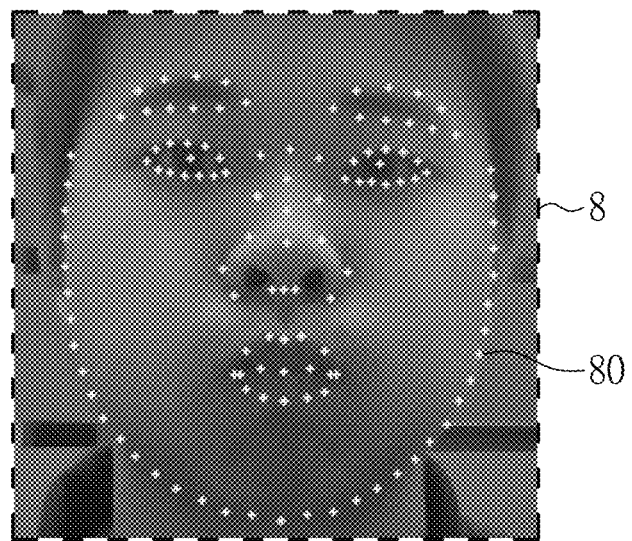
FIG. 8 is a schematic diagram of the cropped training image in Step S602 in FIG. 6.

In step S602, the processor 10 performs a face detection on the training image, then detects 2D landmark points of the face, selects the smallest enclosing rectangle according to the 2D landmark points, enlarges the smallest enclosing rectangle in an appropriate manner, and crops training images according to the enlarged smallest enclosing rectangle. The training image may be a 2D image, and may be captured by one member selected from the image sensor 19, the main color range camera 14, and the auxiliary color cameras 16(1) to 16(N). FIG. 8 is a schematic diagram of the training image after being cropped in step S602, in which the dots are 2D landmark points, the 2D landmark points include 2D outline points 80 and other inner points, and 8 represents an enlarged minimum enclosing rectangle. The 2D outline points 80 may include a lower jaw outline point, and the other inner points may include an eye outline point, an eyebrow outline point, a nose outline point, and a mouth outline point. The processor 10 may select the smallest enclosing rectangle according to the 2D outline points 80. In some embodiments, the processor 10 may perform a roll angle normalization on the cropped training image to stabilize the image input to the artificial neural network model 100, and then input the normalized image into the trained artificial neural network model 100 to generate a 3D image of a user. In other embodiments, the processor 10 may normalize the size of the cropped training image to scale the cropped training image into a predetermined size such as a 128-bit×128-bit×3-bit 2D image in three primary colors (red, green, blue, RGB), and then the normalized image is input into the trained artificial neural network model 100 to generate a 3D image of the user. In other embodiments, the processor 10 may perform a transformation on the minimum enclosing rectangle of the training image to enhance the robustness of the algorithm. The transformation method may involve affine transformations such as a translation, a rotation, and scaling.

In Step S604, the processor 10 inputs the cropped training image into the trained artificial neural network model 100 to perform a forward propagation to generate a set of face shape coefficients and a set of facial expression coefficients. Next, in Step S606, the processor 10 applies the set of face shape coefficients and the set of facial expression coefficients to the principal component analysis-based 3D morphable model 102 to obtain the 3D model point cloud to serve as the 3D prediction image. In Step S608, the 3D predicted image is back-propagated in the artificial neural network model 100 under the supervision of the 3D GT model 104, and finally the 3D predicted image may approximate one image selected from the 3D front angle image and the 3D side angle images of the 3D GT model 104. The artificial neural network model 100 employs a loss function to adjust the parameters of the artificial neural network model 100 to reduce the difference between the 3D predicted image and one image selected from the 3D front angle image and the plurality of 3D side angle images of the 3D GT model 104. The parameters of the artificial neural network model 100 may be represented by a face shape coefficient regression matrix and a facial expression coefficient regression matrix. The processor 10 may calculate a face shape loss according to the face shape coefficient regression matrix, calculate a facial expression loss according to the facial expression coefficient regression matrix, and reduce the face shape loss and facial expression loss by adjusting the parameters in the face shape coefficient regression matrix and the facial expression coefficient regression matrix, thereby reducing a sum of the face shape loss and the facial expression loss. The trained artificial neural network model 100 may generate the face shape coefficients and expression coefficients of the 3D deformed model 102, respectively, providing more details in an expression, having no 3D image initialization problem, and having a better expression tracking ability for larger viewing angles.

Figure 7:
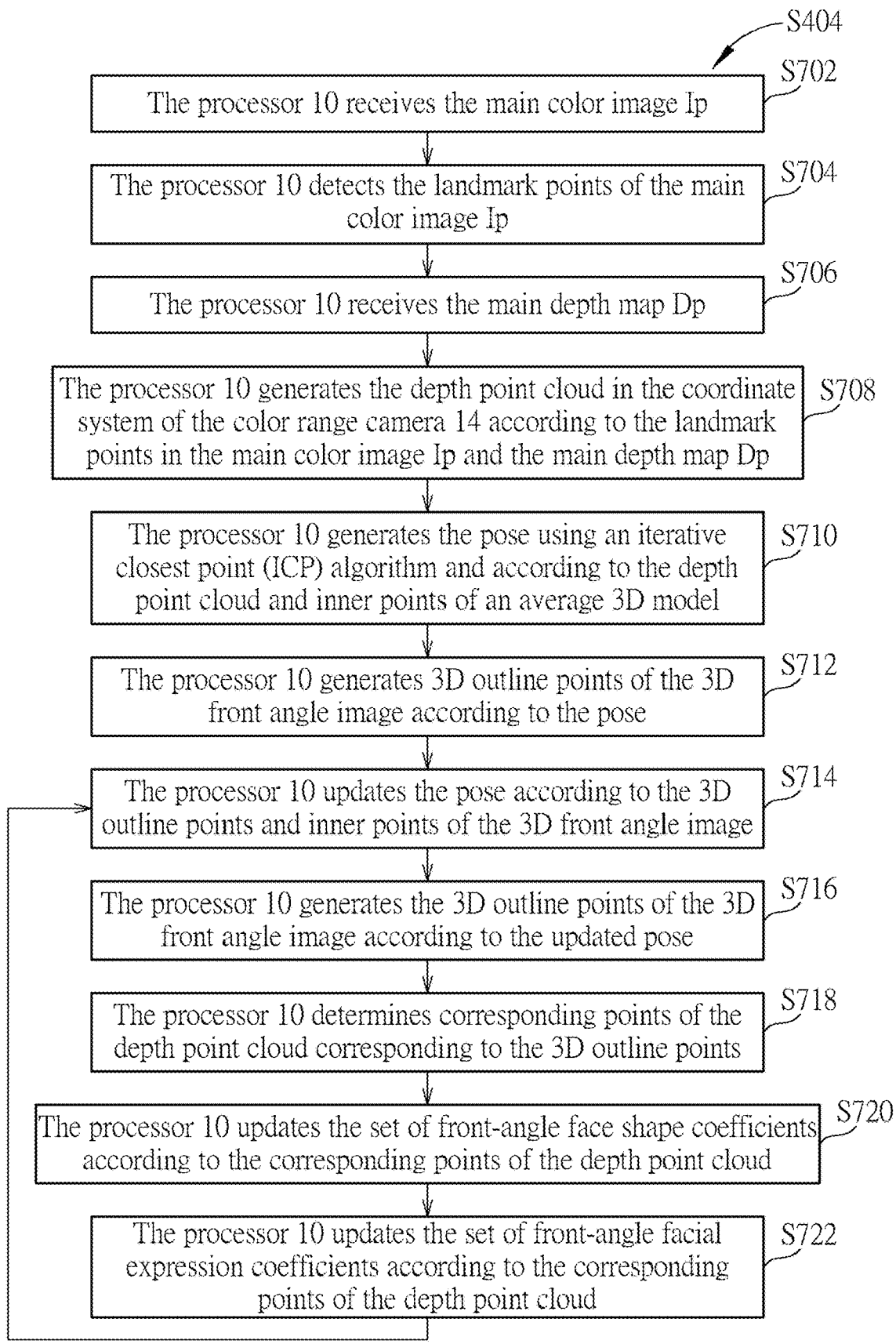
FIG. 7 is a flowchart of Step S404 in FIG. 4.

FIG. 7 is a flowchart of Step S404 in FIG. 4, including Steps S702 to S722, and performing an optimal fitting procedure to generate a pose, the set of front-angle facial expression coefficients, and the set of front-angle facial expression coefficients. Steps S702 to S708 are used to generate the depth point cloud corresponding to the landmark points of the main color image Ip. Steps S710 to S722 are used to generate the pose, the set of front-angle face shape coefficients, and the set of front-angle facial expression coefficients according to the depth point cloud. Any reasonable step change or adjustment is within the scope of the disclosure. Steps S702 to S722 are detailed as follows:

Step S702: The processor 10 receives the main color image Ip;

Step S704: The processor 10 detects the landmark points of the main color image Ip;

Step S706: The processor 10 receives the main depth map Dp;

Step S708: The processor 10 generates the depth point cloud in the coordinate system of the color range camera 14 according to the landmark points in the main color image Ip and the main depth map Dp;

Step S710: The processor 10 generates the pose using an iterative closest point (ICP) algorithm and according to the depth point cloud and inner points of an average 3D model;

Step S712: The processor 10 generates 3D outline points of the 3D front angle image according to the pose;

Step S714: The processor 10 updates the pose according to the 3D outline points and inner points of the 3D front angle image;

Step S716: The processor 10 generates the 3D outline points of the 3D front angle image according to the updated pose;

Step S718: The processor 10 determines corresponding points of the depth point cloud corresponding to the 3D outline points;

Step S720: The processor 10 updates the set of front-angle face shape coefficients according to the corresponding points of the depth point cloud;

Step S722: The processor 10 updates the set of front-angle facial expression coefficients according to the corresponding points of the depth point cloud; go to step S714.

In Step S704, The processor 10 performs landmark point detection on the main color image Ip, and aligns the main depth map Dp and the main color image Ip. In Step S708, the inner points of the 2D landmark points of the main color image Ip are converted into a depth point cloud in the coordinate system of the color range camera 14 using the internal parameters of the main color range camera 14 and according to the main depth map Dp. Next in Step S710, an iterative closest point (ICP) algorithm is performed on the depth point cloud using the 3D inner points of a face database to initialize the pose. The processor 10 determines the extreme points of the parallel lines in the 3D front angle image of the 3D GT model 104 according to the initialized pose to serve as the 3D outline points corresponding to the 2D outline points of the 2D landmark points (Step S712). The processor 10 then uses the 3D inner points and the 3D outline points to re-update the pose (Step S714), and then updates the 3D outline points of the 3D front angle image according to the updated pose (Step S716). Then, the processor 10 determines the corresponding points in the depth point cloud corresponding to the vertices in the 3D front angle image according to the current pose to update the set of front-angle face shape coefficients (Step S720) and the set of front-angle facial expression coefficients (Step S722). The processor 10 uses the updated set of front-angle face shape coefficients and the updated set of front-angle facial expression coefficients to update the 3D front angle image, and uses the new 3D outline points and the new 3D inner points of the updated 3D front angle image to re-update the pose (Step S714). By repeating Steps S714 to S722 for several iterations, a more accurate 3D front angle image may be obtained. In some embodiments, the set of front-angle face shape coefficients and the set of facial expression coefficients may be adjusted manually to obtain a more accurate 3D front angle image.

Step S404 employs the depth information to generate the more accurate 3D front angle image after the optimal fitting procedure.

Figure 9:
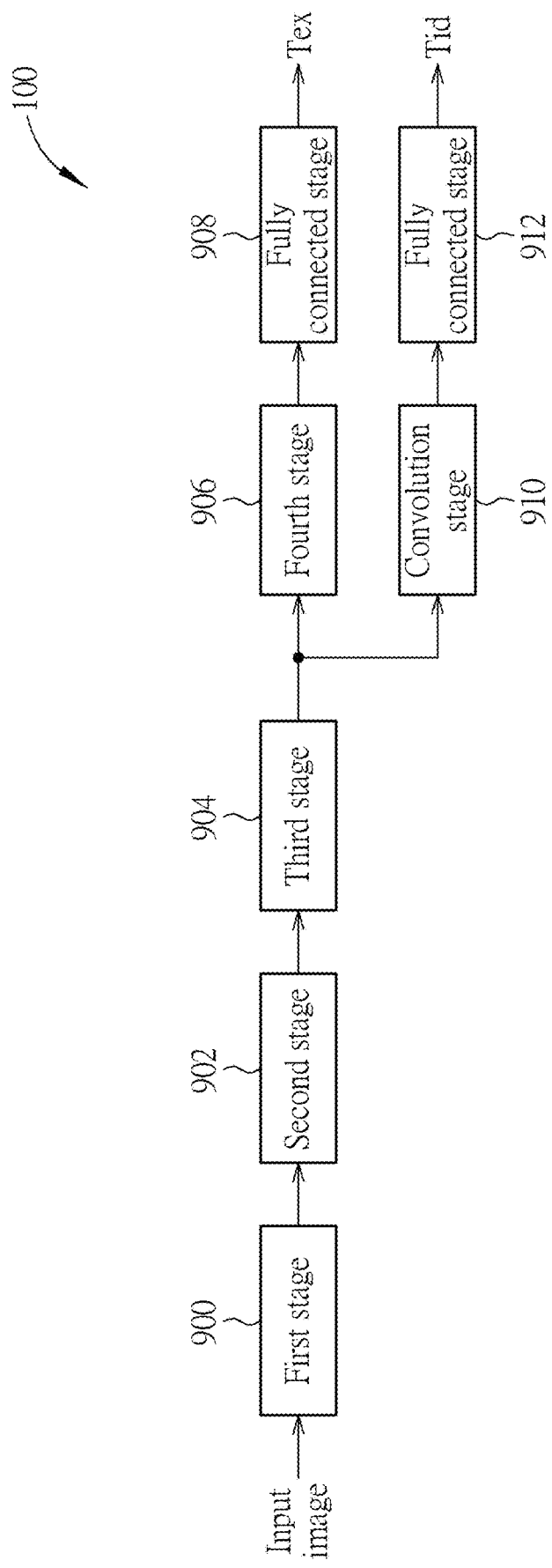
FIG. 9 is a schematic diagram of the artificial neural network model in the system in FIG. 1.

FIG. 9 is a schematic diagram of the artificial neural network model 100. The artificial neural network model 100 includes a first stage 900, a second stage 902, a third stage 904, a fourth stage 906, a fully connected stage 908, a convolution stage 910, and a fully connected stage 912. The first stage 900, the second stage 902, and the third stage 904 are executed in sequence. The third stage 904 is followed by the fourth stage 906 and the convolution stage 910. The fourth stage 906 is followed by the fully connected stage 908. The convolution stage 910 is followed by the fully connected stage 912.

The artificial neural network model 100 may be a ShuffleNet V2 light-weight network. Training images may be a 128-bit×128-bit×3-bit 2D RGB image. The training image is input into the first stage 900 and then passes through the first stage 900, the second stage 902, and the third stage 904. After the third stage 904, the process of the artificial neural network model 100 is split into 2 paths, the first path including the fourth stage 906 and the fully connected stage 908, and the second path including the convolution stage 910 and the fully connected stage 912. The first path may generate 48 expression coefficients Tex. In the second path, the convolution stage 910 involves processing of two 3×3 convolution kernels, and after the data is processed by the fully connected stage 912, 100 face shape coefficients Tid may be generated. Since the face shape coefficients Tid are generated from a regression of the face shape such as chubbiness, it may be separated after the third stage 904. On the other hand, more refined features are required to perform a regression and derive the expression coefficients Tex for expressions such as squinting and grinning, and therefore, a fully connected output is generated after processing in the fourth stage 906.

The artificial neural network model 100 may employ various depths of the networks to achieve the enhanced performance.

Figure 10:
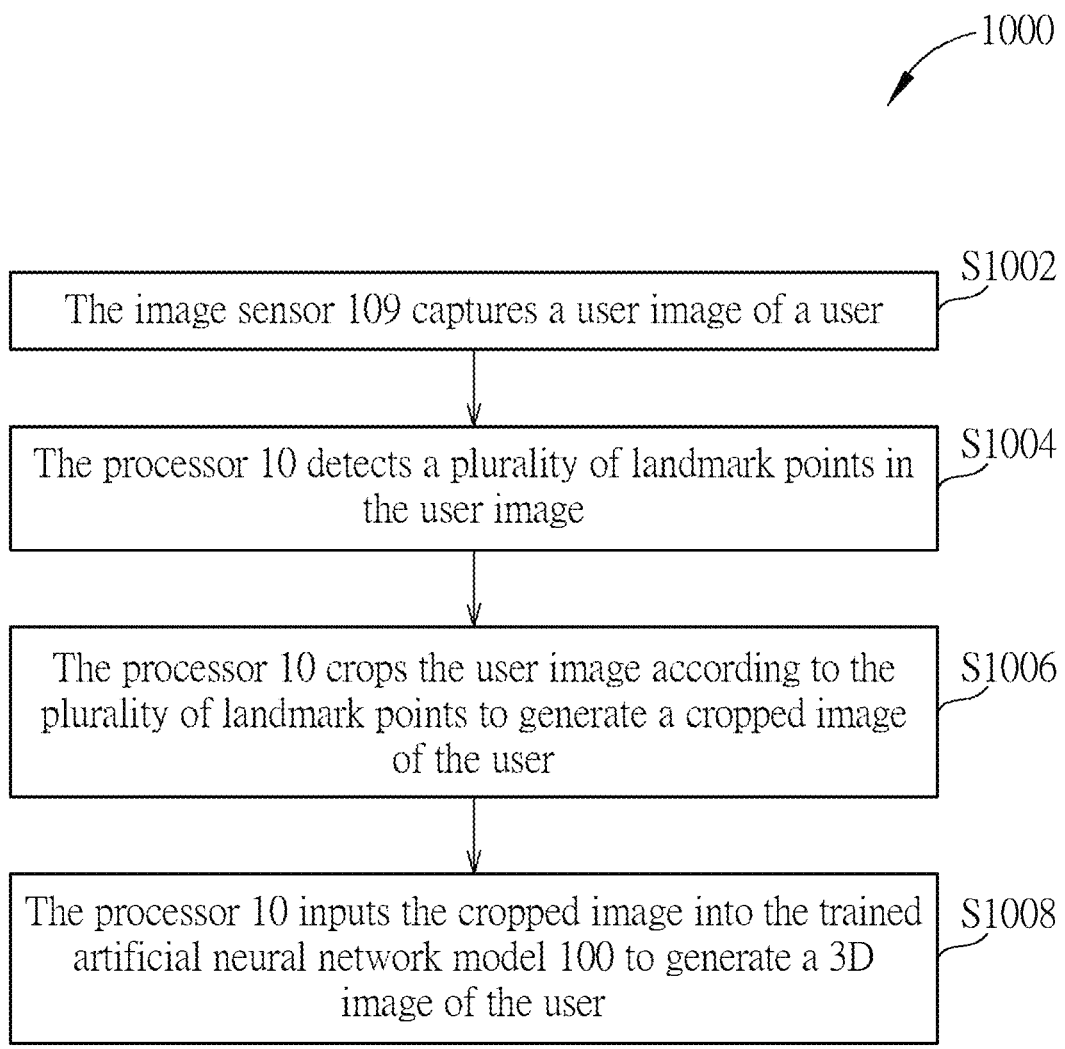
FIG. 10 is a flowchart of a 3D image reconstruction method of the trained artificial neural network model in FIG. 1.

FIG. 10 is a flowchart of a 3D image reconstruction method 1000 of the trained artificial neural network model 100. The 3D image reconstruction method 1000 includes Steps S1002 to S1008 to generate a 3D image of a user according to the user's image. Any reasonable step change or adjustment is within the scope of the disclosure. Steps S1002 to S1008 are detailed as follows:

Step S1002: The image sensor 109 captures a user image of a user;

Step S1004: The processor 10 detects a plurality of landmark points in the user image;

Step S1006: The processor 10 crops the user image according to the plurality of landmark points to generate a cropped image of the user;

Step S1008: The processor 10 inputs the cropped image into the trained artificial neural network model 100 to generate a 3D image of the user.

In step S1008, the cropped user image is input into the trained artificial neural network model 100 to obtain the set of corresponding face shape coefficients and the set of corresponding expression coefficients, and finally the 3D model of the user may be generated using the 3D morphable model 102 according to the set of corresponding face shape coefficients and the set of expression coefficients. Since the 3D GT model 104 and the loss functions are employed for training the artificial neural network model 100, the trained artificial neural network model 100 may generate the face shape coefficients and expression coefficients of the 3D morphable model 102 separately, generating 3D images of a user having more refined expressions, eliminating the problem of 3D image initialization, and providing enhanced tracking performance of the facial expression for large viewing angles.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A deep learning-based three-dimensional (3D) facial reconstruction system, comprising:
   a main color range camera arranged at a front angle of a reference user, and configured to capture a main color image and a main depth map of the reference user from the front angle;
   a plurality of auxiliary color cameras arranged at a plurality of side angles of the reference user, and configured to capture a plurality of auxiliary color images of the reference user from the plurality of side angles;
   a processor coupled to the main color range camera and the plurality of auxiliary color cameras; and
   a memory coupled to the processor and configured to store a plurality of instructions;
   wherein the processor is configured to execute the plurality of instructions to:
      generate a 3D front angle image of a 3D ground truth model according to the main color image and the main depth map;
      generate a plurality of 3D side angle images of the 3D ground truth model according to the 3D front angle image and the plurality of auxiliary color images; and
      train an artificial neural network model according a training image, the 3D front angle image and the plurality of 3D side angle images.

2. The system of claim 1, wherein the processor is further configured to perform optimal fitting on the main color image and the main depth map to generate a pose, front-angle face shape coefficients and front-angle facial expression coefficients, and employ a 3D morphable model to generate the 3D front angle image according to the pose, the front-angle face shape coefficients and the front-angle facial expression coefficients.

3. The system of claim 2, wherein the processor is further configured to:
   detect a plurality of landmark points in the main color image;
   generate a depth point cloud in a coordinate system of the color range camera according to the plurality of landmark points in the main color image and the main depth map;
   employ an iterative closest point algorithm to generate the pose according to the depth point cloud and inner points of an average 3D model;
   generate 3D outline points of the 3D front angle image according to the pose;
   determine corresponding points of the depth point cloud corresponding to the 3D outline points; and
   update the front-angle face shape coefficients and the front-angle facial expression coefficients according to the corresponding points of the depth point cloud.

4. The system of claim 1, wherein:
   the plurality of auxiliary color cameras are calibrated according to the main color range camera to generate corresponding calibration parameters of the auxiliary color cameras; and
   the processor is configured to migrate the 3D front angle image according to corresponding calibration parameters of one of the auxiliary color cameras to generate corresponding side-angle face shape coefficients and corresponding side-angle facial expression coefficients, and generate one of the plurality of 3D side angle images using a 3D morphable model and according to the side-angle face shape coefficients, the side-angle facial expression coefficients and a corresponding auxiliary color image.

5. The system of claim 1, further comprising:
an image sensor coupled to the processor and configured to capture a user image of a user;
wherein the processor is further configured to:
  detect a plurality of landmark points in the user image;
  crop the user image according to the plurality of landmark points to generate a cropped image of the user; and
  input the cropped image into the trained artificial neural network model to generate a 3D image of the user.

6. The system of claim 5, further comprising a display coupled to the processor and configured to display the 3D image of the user.

7. The system of claim 1, further comprising:
an image sensor coupled to the processor and configured to capture a user image of a user;
wherein the processor is further configured to:
  detect a plurality of landmark points in the user image;
  crop the user image according to the plurality of landmark points to generate a cropped image of the user;
  normalize the cropped image to generate a normalized image; and
  input the normalized image into the trained artificial neural network model to generate a 3D image of the user.

8. The system of claim 7, further comprising a display coupled to the processor and configured to display the 3D image of the user.

9. The system of claim 1, wherein the processor is further configured to:
  input the training image into the trained artificial neural network model to generate face shape coefficients and facial expression coefficients;
  employ a 3D morphable model to generate a 3D predicted image according to the face shape coefficients and the facial expression coefficients; and
  adjust a parameter of the artificial neural network model to reduce a difference between the 3D predicted image and an image selected from the 3D front angle image and the plurality of 3D side angle images.

10. The system of claim 1, wherein the artificial neural network model is a convolutional neural network.

11. The system of claim 1, wherein the processor is further configured to employ a yaw angle and a pitch angle of the reference user to define the plurality of side angles.

* * * * *